Figures 1, 2:
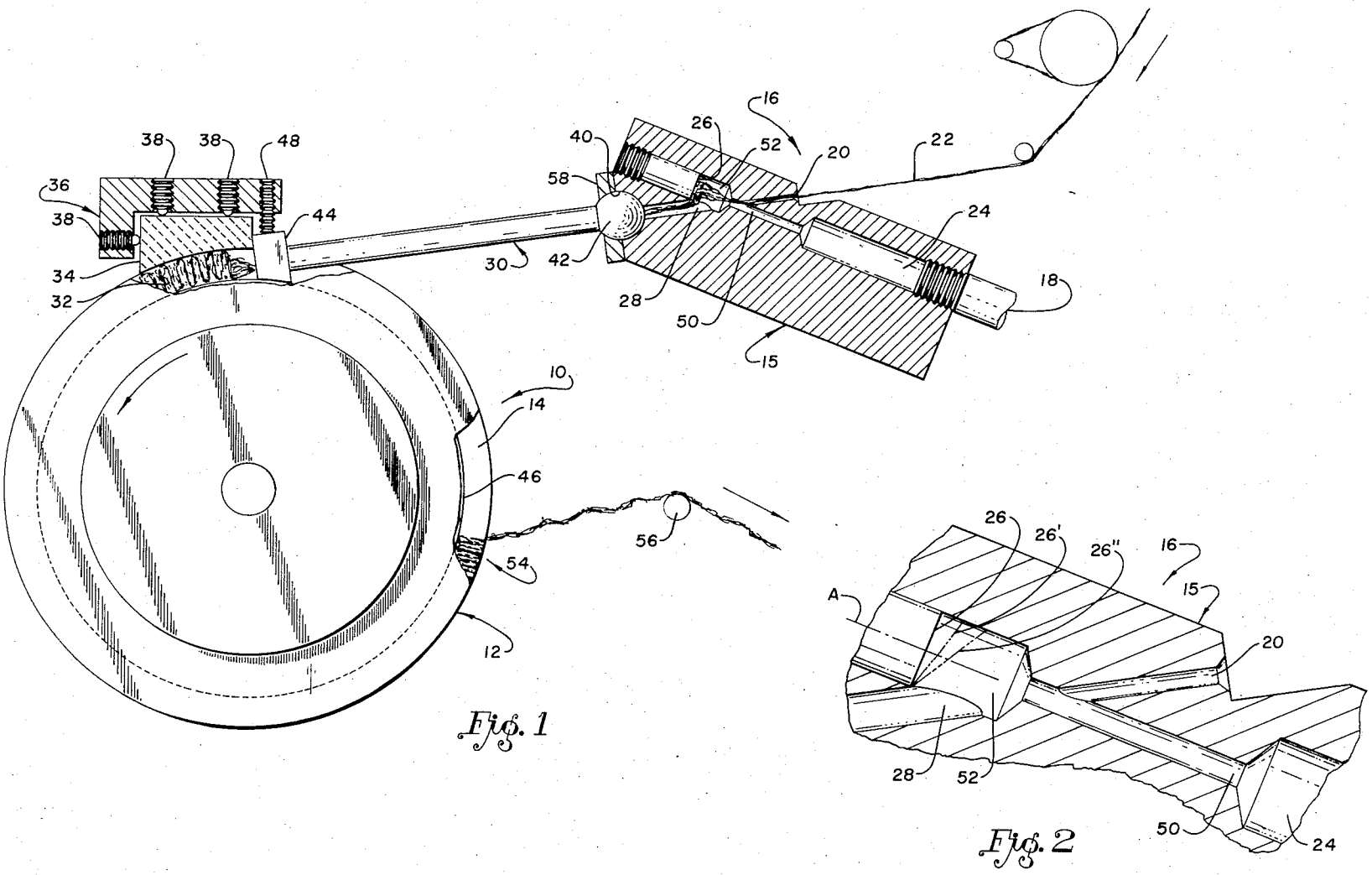

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 6, 1974

925 O.G. 9

T925,006
FLUID JET INJECTOR DEVICE FOR A YARN BULKING APPARATUS

Robert B. Moore, Jr., 504 Woodmere Drive, Kingsport, Tenn. 37663

Continuation of abandoned application Ser. No. 289,929, Sept. 18, 1972. This application Nov. 5, 1973, Ser. No. 413,068

Int. Cl. D02g *1/20, 1/16, 1/12*
U.S. Cl. 28—1.3
1 Sheet Drawing. 7 Pages Specification

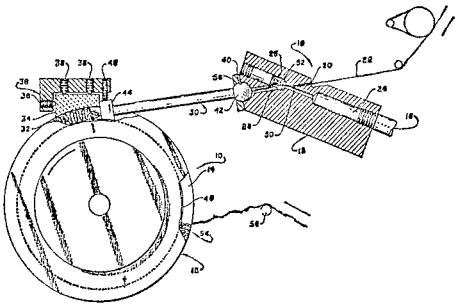

A fluid jet injector device for use with yarn bulking apparatus and other apparatus and adapted to separate the filaments of a yarn bundle and to increase drag tension on the yarn so as to assure constant self-feeding of the yarn from its source to and through the device; to raise the temperature of the yarn to a crimp receptive condition; and to convey the yarn to the bulking apparatus. The housing of the injector device has a passageway through which compressible fluid, preferably heated, and the yarn travel, an anvil against which the compressible fluid and yarn collide and rebound causing increased filament separation and hence increased drag tension, and an outlet into which the compressible fluid and yarn are rebounded from the anvil.

FLUID JET INJECTOR DEVICE FOR A YARN BULKING APPARATUS

Original Filed Sept. 18, 1972